(12) United States Patent
Guo et al.

(10) Patent No.: US 9,979,310 B2
(45) Date of Patent: May 22, 2018

(54) RESONANT DC/DC CONVERTER

(71) Applicant: HANGZHOU ZHONHEN ELECTRIC CO., LTD., Zhejiang (CN)

(72) Inventors: Weinong Guo, Zhejiang (CN); Kang Wei, Zhejiang (CN); Mingjing Xie, Zhejiang (CN)

(73) Assignee: HANGZHOU ELECTRIC CO., LTD., Hangzhou, Zhejiang (CN)

( * ) Notice: Subject to any disclaimer, the term of this patent is extended or adjusted under 35 U.S.C. 154(b) by 0 days. days.

(21) Appl. No.: 15/185,523

(22) Filed: Jun. 17, 2016

(65) Prior Publication Data

US 2017/0244331 A1    Aug. 24, 2017

(30) Foreign Application Priority Data

Feb. 19, 2016    (CN) .......................... 2016 1 0092002

(51) Int. Cl.
*H02M 3/337* (2006.01)
*H02M 1/00* (2006.01)

(52) U.S. Cl.
CPC .. *H02M 3/3376* (2013.01); *H02M 2001/0058* (2013.01)

(58) Field of Classification Search
CPC ............. H02M 3/335; H02M 3/33507; H02M 3/33523; H02M 3/33569; H02M 3/33592
USPC ........................................... 363/21.01–21.18
See application file for complete search history.

(56) References Cited

U.S. PATENT DOCUMENTS

| | | | | |
|---|---|---|---|---|
| 9,356,527 B2* | 5/2016 | Lin | .................... | H02M 3/33569 |
| 2012/0218785 A1* | 8/2012 | Li | ............................ | H02M 1/34 |
| | | | | 363/21.12 |
| 2013/0063981 A1* | 3/2013 | Dujic | ................... | H02M 1/4233 |
| | | | | 363/16 |
| 2013/0265804 A1* | 10/2013 | Fu | ...................... | H02M 3/33576 |
| | | | | 363/17 |

* cited by examiner

*Primary Examiner* — Yemane Mehari
(74) *Attorney, Agent, or Firm* — Muncy, Geissler, Olds & Lowe, P.C.

(57) ABSTRACT

Disclosed is a resonant DC/DC converter, comprising a DC source unit, a power conversion unit, a control unit and an output rectification unit, wherein the power conversion unit comprises a resonance circuit and at least a phase-shift circuit, the phase-shift circuit comprises at least a pair of first switching elements S1, S2 and a phase-shift inductance La, one end of the phase-shift inductance is connected with the bridge node of the first switching element S1, S2, and the other end is coupled to the resonance circuit; the control unit drives each switching element of the power conversion unit, and the switching frequency and the phase shifting angle of the first switching element are calculated according to the feedback signals of the output rectification unit. Further, the resonant DC/DC converter is applicable to series connection solution, which can be extended to more than two circuits in parallel, to achieve intersection; and a phase-shift circuit is added in the resonant DC/DC converter and by adjusting the phase shift angle to drop the output voltage and achieve the adjustment of a wide range of output voltage of the resonant circuit.

10 Claims, 5 Drawing Sheets

RESONANT DC/DC CONVERTER

FIELD OF THE INVENTION

The invention relates to a DC power conversion technique, in particular, to a resonant DC/DC converter.

BACKGROUND

With a simple circuit topology, and a feature of achieving soft switching within the full load range, the resonant converter is widely used in power supply and other products. The resonant converter has many advantages, but it still has some drawbacks such as narrow output voltage range, in particular, when light load or no load, the output voltage is restricted by the voltage gain thus unable to continue to down-regulate.

Taking LLC resonant DC/DC converter as an example, FIG. 1 shows the basic form of a full-bridge LLC resonance circuit, which uses a frequency conversion modulation and control. Without considering a dead zone, switching tubes S1, S4 and S2, S3 drive complementarily and symmetrically, and the duty ratio is set as 50%. Thus, the output voltage gain M can be expressed as:

$$M = \frac{V_o}{V_{in}} = \frac{1}{\sqrt{\left(1 + \frac{1}{k} - \frac{1}{kf_n^2}\right)^2 + Q^2\left(f_n - \frac{1}{f_n}\right)^2}} \quad (1)$$

Where $V_o$, $V_{in}$ are output, input voltage respectively, $f_s$ is switching frequency, $L_r$ is resonant inductance, $L_m$ is excitation inductance, $C_r$ is resonant capacitance, $$f_r = \frac{1}{2\pi\sqrt{L_r C_r}}, f_n = \frac{f_s}{f_r}, k = \frac{L_m}{L_r},$$

$f_r$ is resonant frequency, $f_n$ is normalized frequency, and k is inductance coefficient.

When the resonant converter works under light load or no load, the corresponding switching frequency $f_s$ is greater than the resonant frequency $f_r$. It can be seen through analysis of formula 1 that the voltage gain M is in inverse proportion to the switching frequency $f_s$, and in direct proportion to the inductance coefficient k under the above described state. Theoretically, increasing the switching frequency can obtain relatively small voltage gain, but in practical uses, with the influence of the distributed capacitance of the transformer and the switching elements, a resonance point is newly added on the output voltage gain curve, causing that when LLC resonance circuit works under high frequency state, M increases as $f_s$ increases; as for the method to obtain a relatively small high-frequency gain through reducing the inductance coefficient k thus making the voltage gain curve become sharp, it will increase the magnetic core loss and the conduction loss, thus decreasing the efficiency.

At present, an intermittent control mode, commonly known as a hiccup mode, is frequently used to solve the problem of narrow output voltage range of a resonant converter. When the expected voltage is subject to the lower limit of voltage gain and can not be output, the method is to drive to start an intermittent working mode, that is to use a fixed switching frequency (such as the maximum switching frequency) to drive the switching tube, and stop driving after a time period, then start it again, repeat such mode constantly. Such control mode can effectively widen the lower limit of the output voltage, but it has a similarly significant drawback: the output voltage ripple is relatively high, and the first tube conducting after the ripple is sealed increases the switching loss of hard conducting, therefore, it is necessary to upgrade the stress of devices including the output capacitor and the switching elements.

It is thus clear that the above described three methods have different drawbacks when extending the output voltage range of a full-bridge LLC resonant converter. Similarly, the above described methods have similar drawbacks when they are used in other resonant converters based on a theoretical analysis.

SUMMARY

The object of the invention is to provide a resonant DC/DC converter to solve the problem of narrow output voltage range of the current resonant DC/DC converter, in particular, to solve the problem that when the converter is under a light load or no load, the output voltage is restricted by the voltage gain thus unable to lower. To achieve the above object, the invention adopts the following technical solutions:

A resonant DC/DC converter comprises a DC source unit, a power conversion unit, a control unit and an output rectification unit, the DC source unit is connected with the power conversion unit so as to provide energy for the power conversion unit; wherein the power conversion unit comprises a resonance circuit and at least a phase-shift circuit, the phase-shift circuit comprises at least a pair of first switching elements S1, S2 and a phase-shift inductance La, one end of the phase-shift inductance is connected with the bridge node of the first switching element S1, S2, and the other end is coupled to the resonance circuit; the control unit drives each switching element of the power conversion unit, and the switching frequency and the phase shifting angle of the first switching element are calculated according to the feedback signals of the output rectification unit.

Further, the phase-shift circuit comprises a two or multiple parallel phase-shift circuit.

Further, for the pair of first switching elements, wherein one switching element is connected with the positive electrode of the DC source, and the other is connected with the negative electrode, and these two switching elements are connected with each other, its bridge node is coupled to the phase-shift inductance.

Further, the pair of first switching elements is semiconductor switches such as insulated gate bipolar transistor (IGBT) or metal oxide semiconductor field effect transistor (MOSFET).

Further, the control unit comprises an output current sampling element, an output voltage sampling element and a controller.

Further, the control unit adjusts the phase shifting angle to change between 0° and 180° according to the output sampling, thus extends the range of output voltage gain of the resonance circuit.

Further, the output rectification unit comprises the full-bridge, full-wave, dual voltage and dual current rectifying circuits which are achieved by at least one diode or one synchronous rectifier.

Further, the resonant DC/DC converter is applicable to series connection solution.

Further, the resonant DC/DC converter can be extended to more than two circuits in parallel, to achieve intersection.

The invention can achieve the following beneficial technical effects: a phase-shift circuit is added in the resonant DC/DC converter and a phase shifting control mode is introduced based on the original frequency conversion modulation and control mode, to solve the problem that when the resonant converter is under a light load or no load, the output voltage is restricted by the voltage gain thus unable to lower, thus widening the output voltage range.

BRIEF DESCRIPTION OF THE DRAWINGS

The drawings below show some embodiments of the invention, and ordinary technicians skilled in the art can obtain other drawings without creative work based on the drawings herein.

DETAILED DESCRIPTION

The embodiments described below are only a part rather than whole of embodiments in the invention. All other embodiments made by ordinary technicians skilled in the art without creative work based on the embodiments herein shall fall within the scope of protection of the present invention.

Example 1

Figure 1:
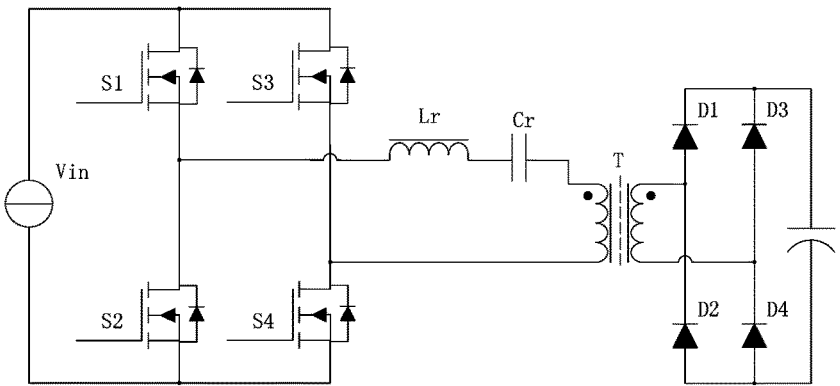
FIG. 1 is a schematic diagram of the full-bridge LLC resonant DC/DC converter.
Figure 2:
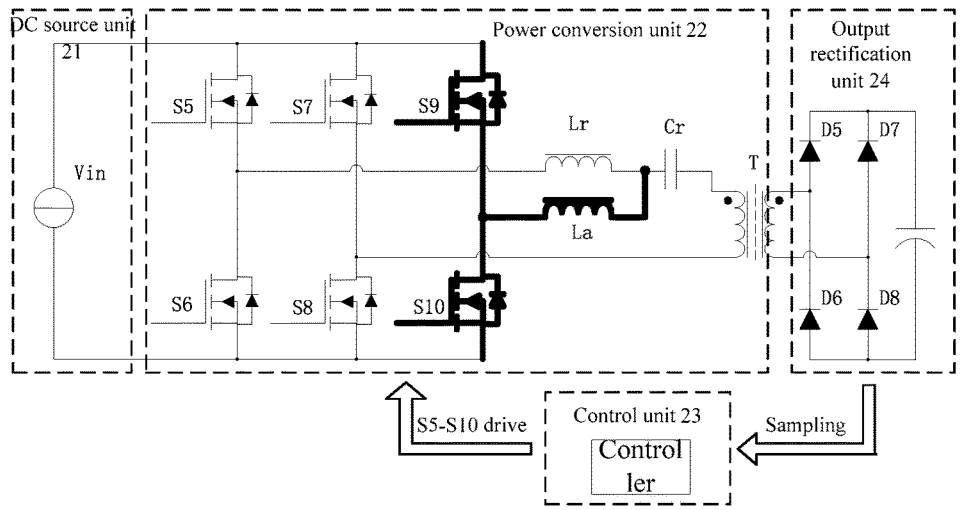
FIG. 2 is a circuit schematic diagram of the resonant DC/DC converter according to an embodiment of invention.

Referring to FIG. 2, the resonant DC/DC converter 20 comprises a DC source unit 21, a power conversion unit 22, a control unit 23 and an output rectification unit 24, wherein the DC source unit 21 provides energy for the power conversion unit 22, the power conversion unit 22, besides a resonance circuit, comprises at least a phase-shift circuit, and the control unit 23 outputs the working frequency and the phase shifting angle of the switching elements of the power conversion unit 22 according to the sampled signals of the output rectification unit 24. Thus it can be seen that the resonant DC/DC converter 20 achieves the objective of wide output voltage range of the resonance circuit through introducing the phase-shift circuit.

The power conversion unit 22 comprises a resonance circuit and a phase-shift circuit. In the embodiment, the resonance circuit adopts a full-bridge LLC resonant DC/DC converter, and the fifth switching element S5, the sixth switching element S6 and the seventh switching element S7, the eighth switching element S8 are complementary and symmetric to drive. Preferably, the resonant elements are arranged according to the sequence: resonant inductance $L_r$, resonant capacitance $C_r$ and then transformer T, i.e., the first end of the resonant inductance $L_r$ is coupled to the bridge node of the fifth switching element S5 and the sixth switching element S6, the second end is connected to the resonant capacitance $C_r$, then the $C_r$ is connected with the transformer T, the other end of the transformer T is finally coupled to the bridge node of the seventh switching element S7 and the eighth switching element S8. Additionally, the phase-shift circuit preferably comprises the ninth switching element S9, the tenth switching element S10 and the phase-shift inductance $L_a$; wherein the ninth switching element S9 is connected with the tenth switching element S10, while one end of S9 is connected with the positive electrode of the DC source, and the S10 is connected with the negative electrode; one end of the phase-shift inductance $L_a$ is coupled to the bridge node of the ninth switching element S9 and the tenth switching element S10, and the other end is connected with the junction node between the resonant inductance $L_r$ and the resonant capacitance $C_r$. Generally, switching elements can be insulated gate devices such as insulated gate bipolar transistor (IGBT) or metal oxide semiconductor field effect transistor (MOSFET), and can also be other new semiconductor switches.

The control unit 23 detects the voltage and current signals of the output rectification unit 24 (the output rectification unit 24 in the embodiment adopts a full-bridge rectification), thus mainly comprising a current sampling element, a voltage sampling element and a controller. The output end of the controller is connected with the grid electrode of each switching element of the power conversion unit 22, and the driving frequency of each switching tube and the phase shifting angle of the ninth switching element S9 and the tenth switching element S10 are adjusted according to the output feedbacks.

Figure 3:
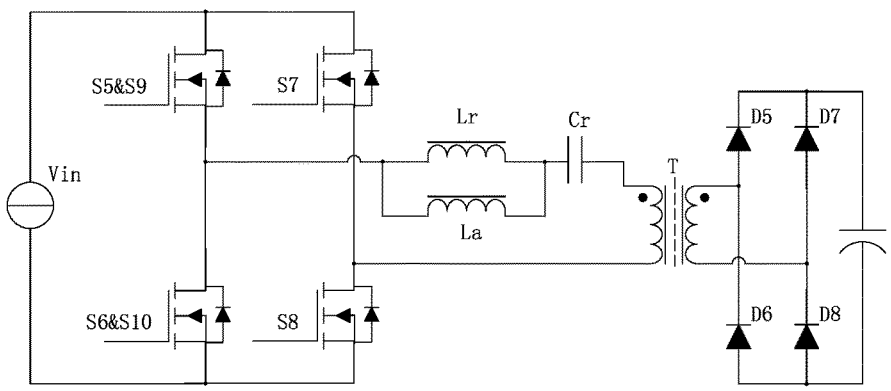
FIG. 3 is an equivalent circuit schematic diagram of the converter shown in FIG. 2 with 0° phase shift.
Figure 4:
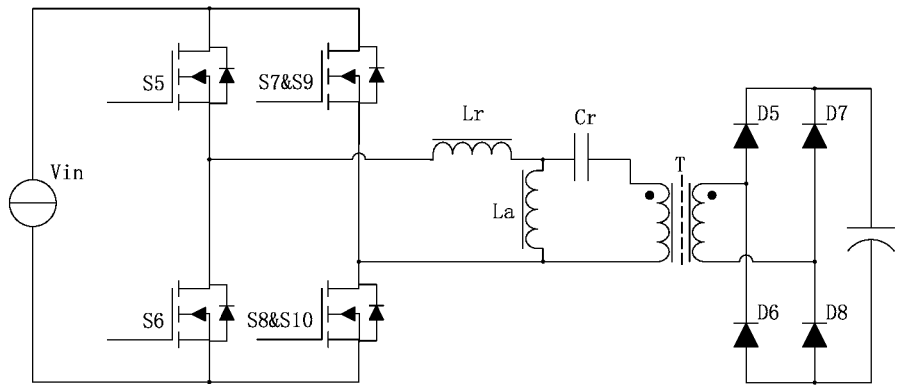
FIG. 4 is an equivalent circuit schematic diagram of the converter shown in FIG. 2 with 180° phase shift.

To further analyze the principle of circuits, respectively discuss two limiting work conditions of the embodiment: phase shift 0° and 180°. Referring to FIG. 3, an equivalent circuit schematic diagram of the converter with 0° phase shift, the resonant inductance $L_r$ and the phase-shift inductance $L_a$ is connected in parallel, the fifth switching element S5 and the sixth switching element S6 are respectively connected with the ninth switching element S9 and the tenth switching element S10 in parallel, with the same paired-tube drive, so essentially, the circuit is a full-bridge LLC, with a frequency conversion modulation and control mode. Referring to FIG. 4, an equivalent circuit schematic diagram of the converter with 180° phase shift, the phase-shift inductance $L_a$ is connected in parallel with two ends of the resonant capacitance $C_r$ and the transformer T, the seventh switching element S7 and the eighth switching element S8 are respectively connected with the ninth switching element S9 and the tenth switching element S10 in parallel, similarly, the paired-tube drive is the same, apparently, the resonant cavity still works under an inductive condition, and the converter adopts a control mode of frequency conversion modulation and phase shift.

It is assumed that working conditions are the same except the phase shifting angle in the above described circuit. To be convenient for analysis of output voltage gain, make the excitation inductance and the reflected impedance of the resonant capacitance and the transformer be equivalent to $R_{equal}$ when calculation, so the voltage gain of the equivalent load in FIG. 3 and FIG. 4 $M'_0$, $M'_{180}$ are respectively expressed as formula 2, 3:

$$M'_0 = \frac{V_{equal}}{V_{in}} = \frac{R_{equal}(L_r + L_a)}{L_r L_a + R_{equal}(L_r + L_a)} \quad (2)$$

$$M'_{180} = \frac{V_{equal}}{V_{in}} = \frac{R_{equal} L_a}{L_r L_a + R_{equal}(L_r + L_a)} \quad (3)$$

As the output voltage $V_o$ is in direct proportion to the equivalent load voltage $V_{equal}$, similarly, the output voltage gain M is in direct proportion to the equivalent load voltage gain M', formula 2 is divided by formula 3, and get:

$$\frac{M_0}{M_{180}} = \frac{M'_0}{M'_{180}} = 1 + \frac{L_r}{L_a} \quad (4)$$

It can be seen through analysis of formula 4, when phase shifts 180°, the voltage gain is less than 0°. In addition, when the phase shifting angle is greater than 0° but less than 180°, the circuit can be regarded simply as the combination of the above two working conditions, so the voltage gain decreases as the phase shifting angle increases. Therefore, increase of phase shifting angle can reduce the output voltage, and widen the adjustable range of output voltage.

Example 2

Figure 5:
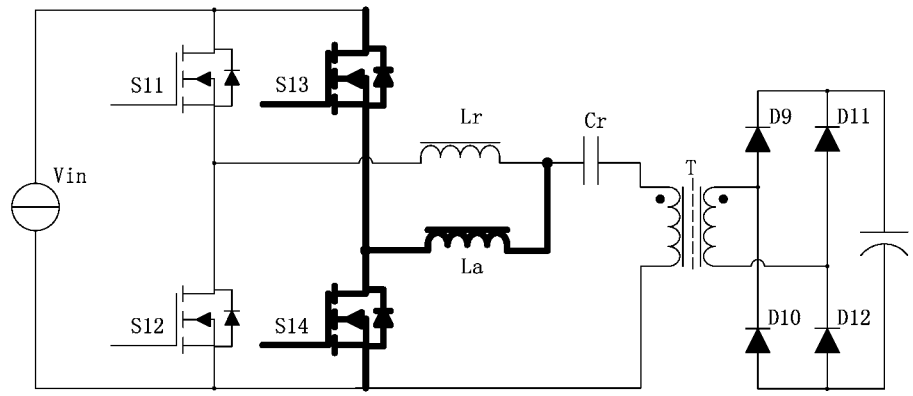
FIG. 5 is a circuit schematic diagram of the other embodiment of the resonant DC/DC converter in the invention.

Referring to FIG. 5, the difference between this embodiment and the previous one is that the resonance circuit in this embodiment adopts a half-bridge LLC resonant DC/DC converter, wherein the eleventh switching element S11 and the twelfth switching element S12 are complementary and symmetric to drive. Preferably, the resonant elements are arranged according to the sequence: resonant inductance $L_r$, resonant capacitance $C_r$ and then transformer T, i.e., the first end of the resonant inductance $L_r$ is coupled to the bridge node of the eleventh switching element S11 and the twelfth switching element S12, the second end is connected to the resonant capacitance $C_r$, then the $C_r$ is connected with the transformer T, the other end of the transformer T is finally coupled to the negative electrode of the DC source. Additionally, the phase-shift circuit preferably comprises the thirteenth switching element S13, the fourteenth switching element S14 and the phase-shift inductance $L_a$; wherein the thirteenth switching element S13 is connected with the fourteenth switching element S14, while one end of S13 is connected with the positive electrode of the DC source, and the S14 is connected with the negative electrode; one end of the phase-shift inductance $L_a$ is coupled to the bridge node of the thirteenth switching element S13 and the fourteenth switching element S14, and the other end is connected with the junction node between the resonant inductance $L_r$ and the resonant capacitance $C_r$.

Example 3

Figure 6:
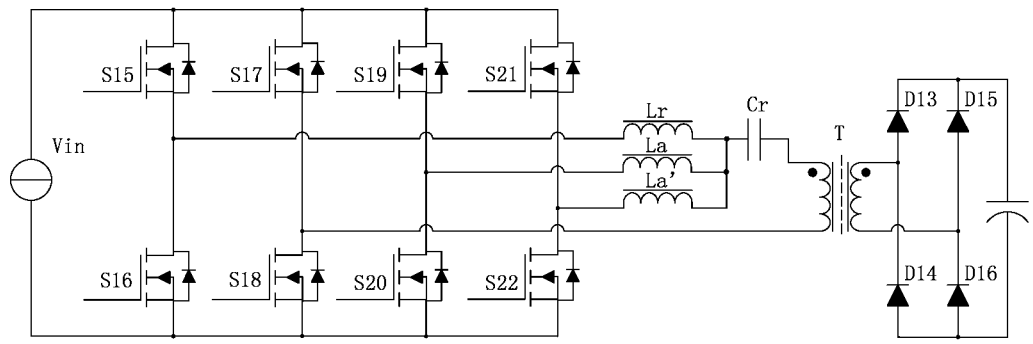
FIG. 6 is a schematic diagram of a multi-circuit phase shifting resonant DC/DC converter.

Referring to FIG. 6, the embodiment is a multi-circuit phase shifting resonant DC/DC converter. The difference between this embodiment and embodiment 1 is that the phase-shift circuit is comprised of a two-circuit paralleled bridge arm, switching elements are respectively connected with the positive and negative electrodes of DC source, and the junction node of the two phase-shift inductance is coupled to the resonance circuit.

Example 4

Figure 7:
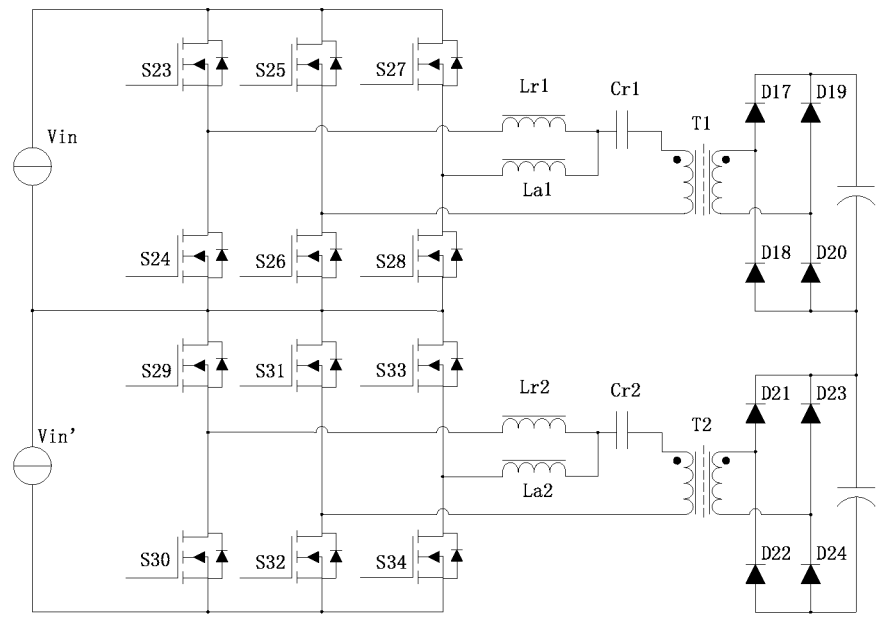
FIG. 7 is a schematic diagram of a series connected resonant DC/DC converter.

Referring to FIG. 7, the embodiment is a series connected resonant DC/DC converter, which consists of two converters described in embodiment 1, wherein the DC source units and the power conversion units of the two converters are connected in series with each other, and the output rectification units are connected in series.

Example 5

Figure 8:
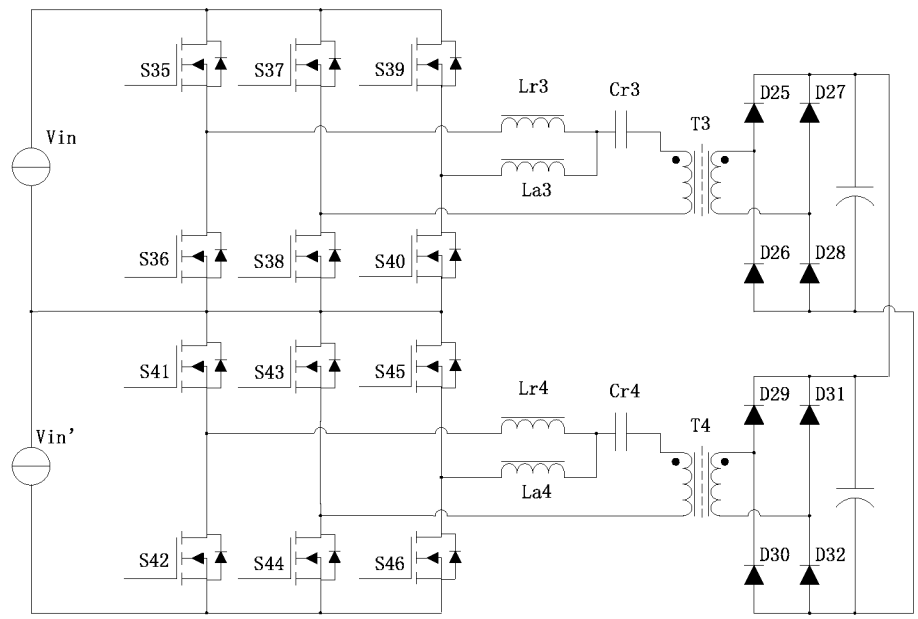
FIG. 8 is a schematic diagram of the other series connected resonant DC/DC converter.

Referring to FIG. 8, the embodiment is the other series connected resonant DC/DC converter. The difference between this embodiment and embodiment 4 is that the output rectification units are connected in parallel with each other.

Example 6

Figure 9:
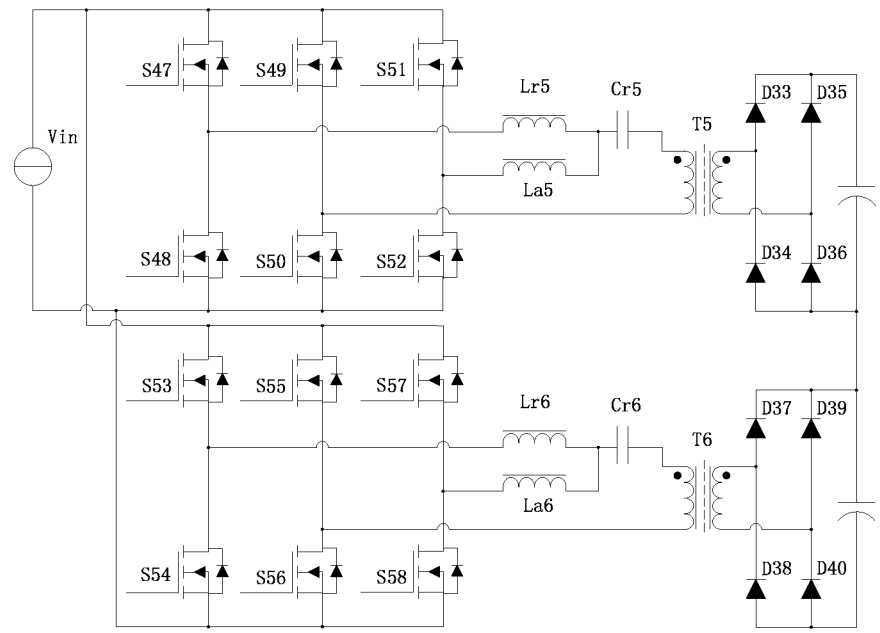
FIG. 9 is a schematic diagram of a two-circuit interleaving resonant DC/DC converter.

Referring to FIG. 9, the embodiment is a two-circuit interleaving resonant DC/DC converter, which consists of two converters described in embodiment 1, wherein the power conversion units are connected in parallel with each other, then connected to the positive and negative electrodes of DC source, and the output rectification units are connected in series.

Example 7

Figure 10:
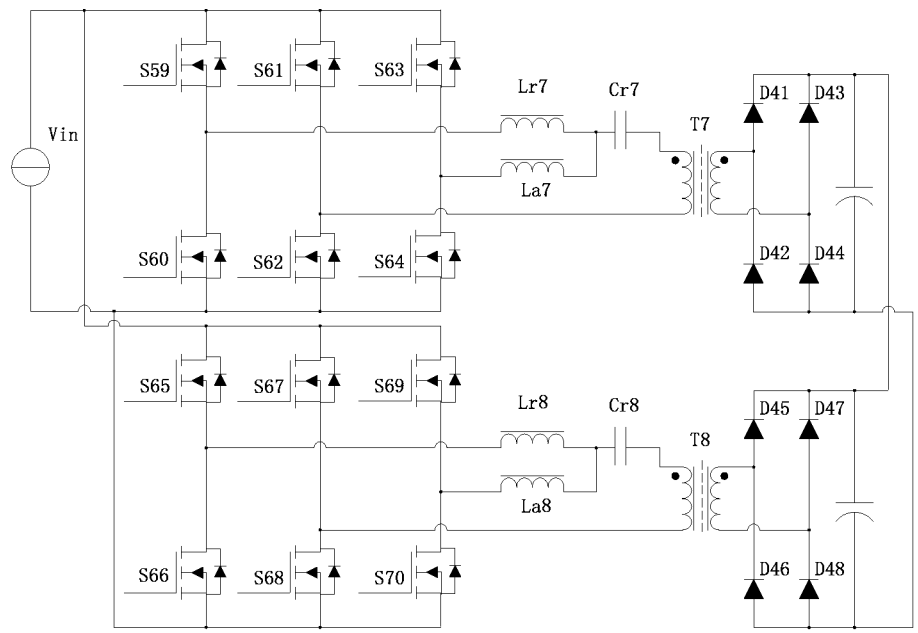
FIG. 10 is a schematic diagram of the other two-circuit interleaving resonant DC/DC converter.

Referring to FIG. 10, the embodiment is the other two-circuit interleaving resonant DC/DC converter. The difference between this embodiment and embodiment 6 is that the output rectification units are connected in parallel with each other.

Example 8

Figure 11:
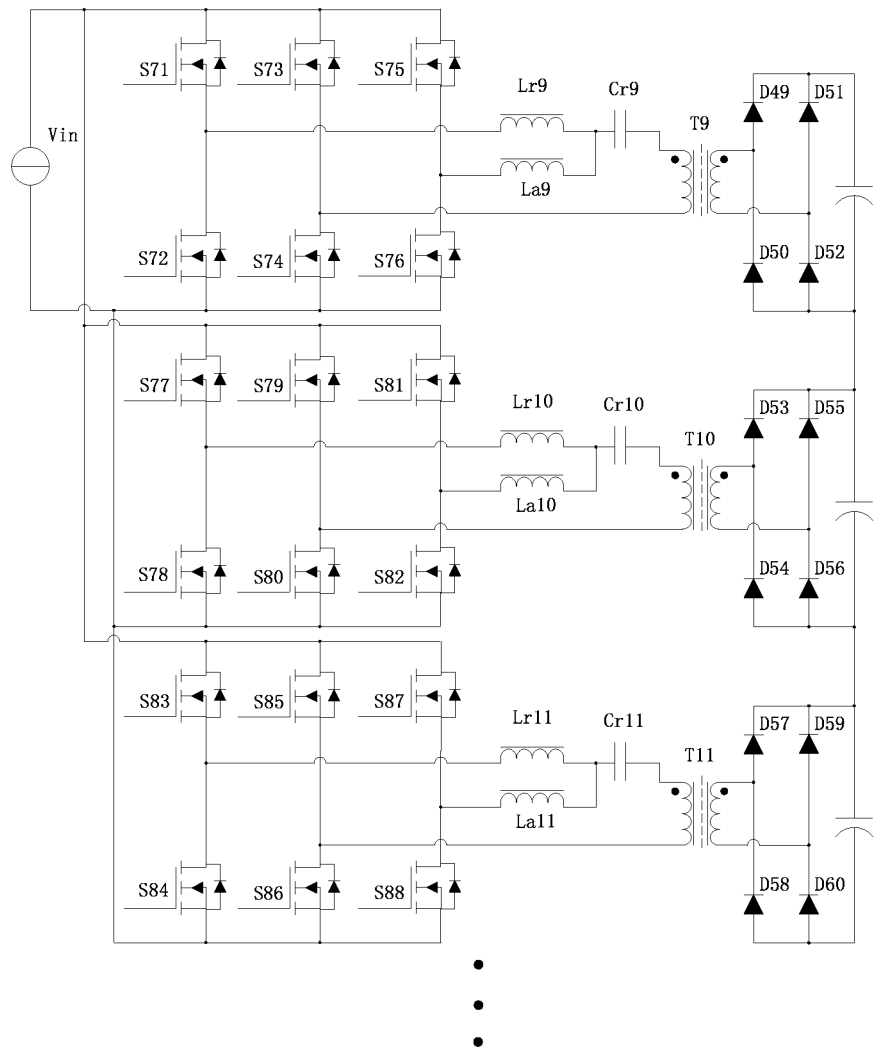
FIG. 11 is a schematic diagram of a multi-circuit interleaving resonant DC/DC converter.
Figure 12:
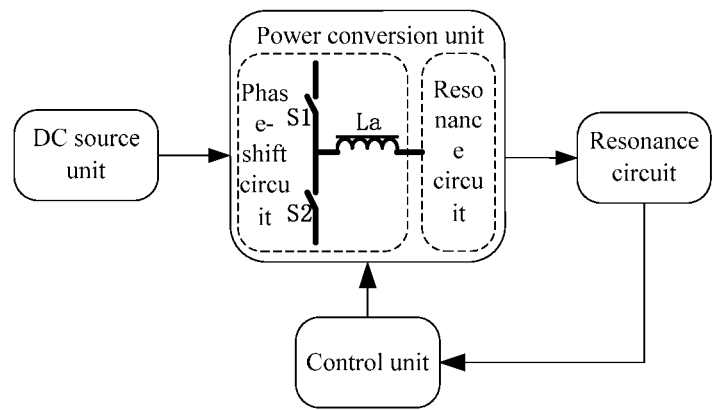
FIG. 12 is a functional block diagram of the resonant DC/DC converter according to embodiments of the invention.

Referring to FIG. 11, the embodiment is a multi-circuit interleaving resonant DC/DC converter, which consists of several converters described in embodiment 1, wherein the power conversion units are connected in parallel with each other, then connected to the positive and negative electrodes of DC source, and the output rectification units are connected in series.

The invention claimed is:

1. A resonant DC/DC converter, comprising:
a DC source unit;
an auxiliary branch;
a power conversion unit; and
a control unit and an output rectification unit, the DC source unit is connected with the power conversion unit so as to provide energy for the power conversion unit, wherein the power conversion unit comprises a resonance circuit and at least a phase-shift circuit, the phase-shift circuit comprises at least a pair of first switching elements and a phase-shift inductance, one end of the phase-shift inductance is connected with the bridge node of the first switching element, and the other end is coupled to the resonance circuit,
wherein the control unit drives each switching element of the power conversion unit, and the switching frequency and the phase shifting angle of the first switching element are calculated according to the feedback signals of the output rectification unit, wherein when there is no phase-shifting, the additional auxiliary branch shares half of the main power, and wherein when phase-shifting occurs, the auxiliary branch can generate a commutation current and share a part of the main power.

2. The resonant DC/DC converter according to claim 1, wherein the phase-shift circuit comprises two or multiple parallel phase-shift circuits.

3. The resonant DC/DC converter according to claim 1, wherein for the pair of first switching elements, wherein one switching element is connected with the positive electrode of the DC source, and the other is connected with the negative electrode, and these two switching elements are connected with each other, its bridge node is coupled to the phase-shift inductance.

4. The resonant DC/DC converter according to claim 1, wherein the pair of first switching elements are semiconductor switches.

5. The resonant DC/DC converter according to claim 1, wherein the semiconductor switch is insulated gate bipolar transistor (IGBT) or metal oxide semiconductor field effect transistor (MOSFET).

6. The resonant DC/DC converter according to claim 1, wherein the control unit comprises an output current sampling element, an output voltage sampling element and a controller.

7. The resonant DC/DC converter according to claim 1, wherein the control unit adjusts the phase shifting angle to change between 0° and 180° according to the output sampling, thus extends the range of output voltage gain of the resonance circuit.

8. The resonant DC/DC converter according to claim 1, wherein the output rectification unit comprises a current rectifying circuit which are achieved by at least one diode or one synchronous rectifier.

9. The resonant DC/DC converter according to claim 1, wherein the resonant DC/DC converter is applicable to series connection solution.

10. The resonant DC/DC converter according to claim 1, wherein the resonant DC/DC converter can be extended to more than two circuits in parallel, to achieve intersection.

* * * * *